US005195650A

United States Patent [19]

Leidig

[11] Patent Number: 5,195,650
[45] Date of Patent: Mar. 23, 1993

[54] LEAKAGE PREVENTION SYSTEM FOR LIQUID STORAGE AND TRANSPORTATION TANKS

[76] Inventor: Tom Leidig, 114 Evernia St., Jupiter, Fla. 33458

[21] Appl. No.: 926,674

[22] Filed: Aug. 10, 1992

[51] Int. Cl.⁵ .............................................. B65D 88/16
[52] U.S. Cl. .................................. 220/461; 220/900; 220/571
[58] Field of Search ............... 220/461, 571, 900, 403, 220/401

[56] References Cited

U.S. PATENT DOCUMENTS

| | | | |
|---|---|---|---|
| 2,439,562 | 4/1948 | Cunningham | 220/900 |
| 3,782,588 | 1/1974 | Allen | 220/900 |
| 4,088,240 | 5/1978 | San Miguel | 220/900 |
| 4,469,295 | 9/1984 | Schuster | 220/900 |
| 5,038,960 | 8/1991 | Seeny | 220/461 |

Primary Examiner—Joseph Man-Fu Moy
Attorney, Agent, or Firm—Malloy, Downey & Malloy

[57] ABSTRACT

A leakage prevention system, to be used in combination with a liquid storage and transportation tank, which is comprised primarily of a puncture proof bladder disposed along the inner surface of a tank and constructed so as to be flexible and liquid impervious. The puncture proof bladder is securely fastened to the upper surface of the tank and is connected at a flanged aperture to a means for containing and redistributing overflow that may result from impact to the puncture proof bladder.

11 Claims, 3 Drawing Sheets

LEAKAGE PREVENTION SYSTEM FOR LIQUID STORAGE AND TRANSPORTATION TANKS

BACKGROUND OF THE INVENTION

1. Field of the Invention

This invention relates to a leakage prevention system, to be used in combination with liquid storage and transportation tanks such as those used in tankers and oil trucks, adapted to be flexible, liquid impervious and completely puncture resistant, and be securely fastened to the upper surface of the tank in a manner which permits the utilization of overflow redistribution and containment means attached at a flanged aperture.

2. Description of the Related Art

In the modern battle between industrial advancement and environmental consciousness, there is a pressing need for a safe and efficient means of transporting environmentally harmful, yet industrially vital resources such as crude oil. The most effective means for transporting such resources has proven to be large tankers or oil trucks, but these means are not environmentally secure and can result in disastrous spills. As a result, a means for further securing the puncture prone tanks commonly utilized is needed.

Among the method utilized to attempt to secure tanks from puncture is that of installing a double bulkhead between the exterior of the transporting vessel and the holding tank. This method, which is the most commonly used, only protects against shallow punctures because the inner bulkhead is no more puncture resistant that the outer bulkhead, and is there merely as a secondary restraint source. Further, the dual bulkhead protection method is industrially inefficient because it substantially reduces the volume that may be carried by the vessel, and requires that existing vessels wanting to install the dual bulkhead be removed from service for extended periods of time.

Other smaller scale methods of securing gas tanks, such as in the patent to Boschi, et al., U.S. Pat. No. 3,426,937 and Suter, U.S. Pat. No. 3,622,035, are also ineffective for providing a reliable securing method for use in combination with large liquid storage and transportation tanks. The patent to Boschi, et al. discloses an impact resistant tank containing a flexible inner liner, which while providing a means for securing the tank from a displaced impact, does not provide any protection from concentrated punctures that would poke through the flexible liner. The patent to Suter discloses a vehicle puncture resistant fuel container adapted to be lightweight, and provide added puncture protection in particularly vulnerable and puncture prone areas of the fuel tank. The container discloses a flexible fuel cell disposed within a rigid supporting structure, and woven puncture resistant pads or maps which are placed on the exterior of the rigid supporting structure in accordance with known, vulnerable areas of the fuel tank. The puncture resistant patches of Suter are not intended to provide protection for the entire tank, but are only intended as a means to guard certain areas from relatively low force punctures that could still pass through the necessarily lightweight rigid supporting structure. Further, the fuel container in Suter does not provide a means for containing and redistributing overflow that would result from the compression of the flexible fuel cell during impact. These smaller scale protection methods do not relieve the need for a leakage prevention method capable of protecting against sharp, forceful impacts, and when necessary, redistributing and containing overflow that may result when storage and transportation tanks, which necessarily contain a maximum volume, are subjected to impact which compresses the tank. Further, they provide no remedy for existing tanks that did not have such a container installed during their initial building.

Applicant's invention does address all these needs. Applicant's leakage prevention system provides a method directed to withstand punctures from forceful impact such as those capable of rupturing the hull of a tanker. The invention provides a method that will be industrially acceptable in that very little of the storage and transportation tank's capacity will be removed, and, since the installation does not require restructuring of existing tanks and may be easily installed in existing tanks, the down time while the vessel is refitted will be minimal. Applicant's invention is also environmentally beneficial in that, in addition to providing a puncture resistant shell that will prevent leakage at the point of impact, it also provides a means of safely containing and redistributing overflow that will necessarily result when an impact occurs.

SUMMARY OF THE INVENTION

The present invention is directed towards a leakage prevention system for use in combination with liquid storage and transportation tanks, as those used in tankers and oil trucks. The leakage prevention system is comprised primarily of a puncture proof bladder sized and disposed within the inner surface of the storage and transportation tank. The puncture proof bladder, which includes an inner lining of a liquid impervious material, and an outer lining of a puncture resistant shell, is designed to be substantially flexible and includes fastening means which allows secure attachment of the puncture proof bladder to the upper surface of the tank. The puncture proof bladder is fastened in such a manner as to allow a flanged aperture to be securely fitted around means for containing and redistributing overflow that may result from impact to the puncture proof bladder.

BRIEF DESCRIPTION OF THE DRAWINGS

For a fuller understanding of the nature of the present invention, reference should be had to the following detailed description taken in connection with the accompanying drawings in which.

DETAILED DESCRIPTION OF THE PREFERRED EMBODIMENT

Figure 1:
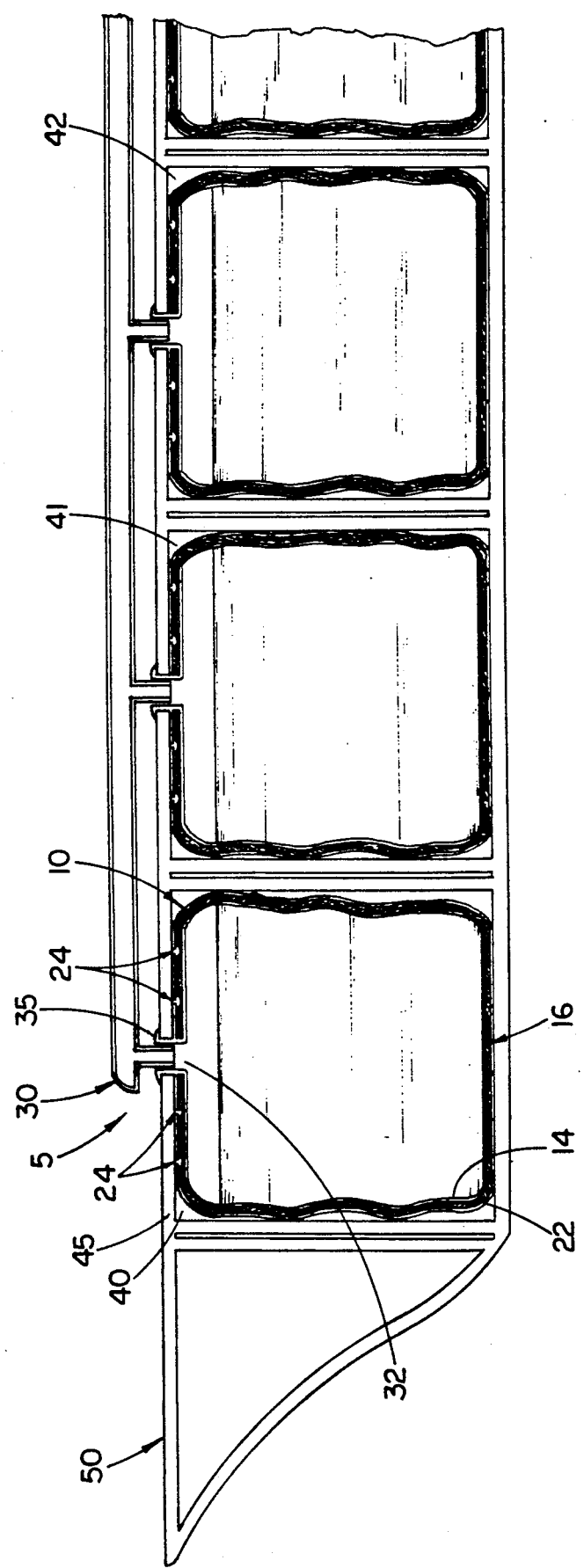
FIG. 1 is a perspective view of the leakage prevention system installed within the liquid storage and transportation tank of an oil tanker type vessel.

As shown in FIG. 1, the present invention is directed towards a leakage prevention system generally indicated as 5, to be used in combination with a liquid storage and transportation tank 40 of the type normally used in oil tanker type vessels 50.

Figure 2:
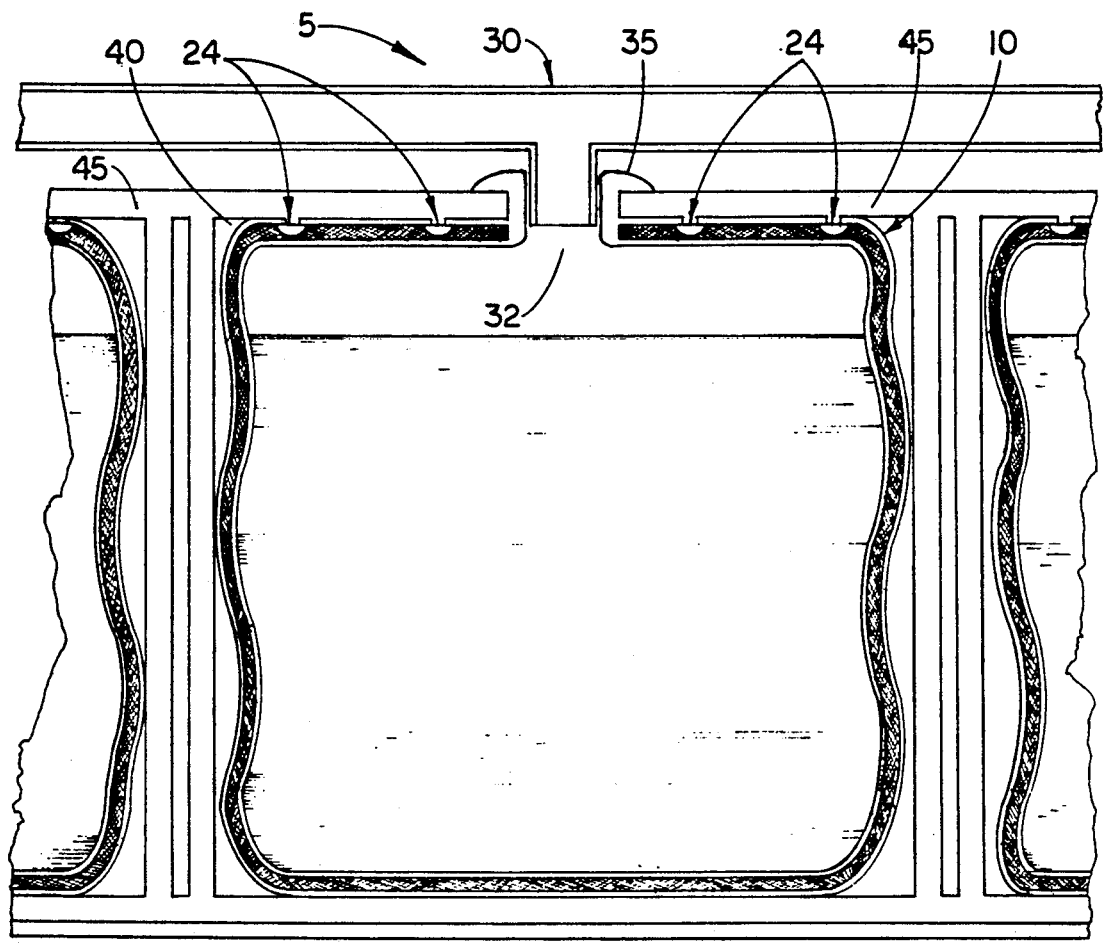
FIG. 2 is a detailed cross-sectional view of the installed leakage prevention system.
Figure 3:
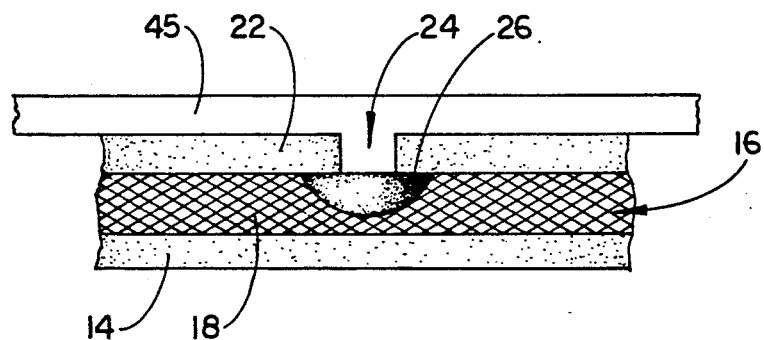
FIG. 3 is a detailed cross-sectional view of the puncture proof bladder.

As best seen in FIG. 2, the leakage prevention system 5 is primarily composed of a puncture proof bladder 10. The puncture proof bladder 10, which is designed to be substantially flexible, is primarily composed of two material layers, 14 and 16, and further include fastening means comprised of an exterior flexible lining 22 and rivet type fasteners 24. As detailed in FIG. 3, there is an inner layer 14 composed of a liquid impermeable, substantially flexible rubber-type material, which functions as a means of securely containing the stored liquid. Surrounding the inner layer 14 is an outer puncture resistant layer generally indicated as 16. The outer layer 16 is primarily composed of an interwoven material mesh 18 which utilizes a substantially puncture proof material such as Kevlar to form the substantially flexible yet puncture resistant mesh. Surrounding the outer layer 16 is the exterior flexible lining 22, which is composed of substantially the same material as inner layer 14 encases and supports the puncture proof bladder as part of the fastening means. Passing through the exterior flexible lining 22 and connected solely along the upper surface 45 of the liquid storage and transportation tank 40, are rivet type fasteners 24 whose flanged end 26 is along the interior surface of the exterior flexible lining 2 in order to provide more secure fastening.

Figure 4:
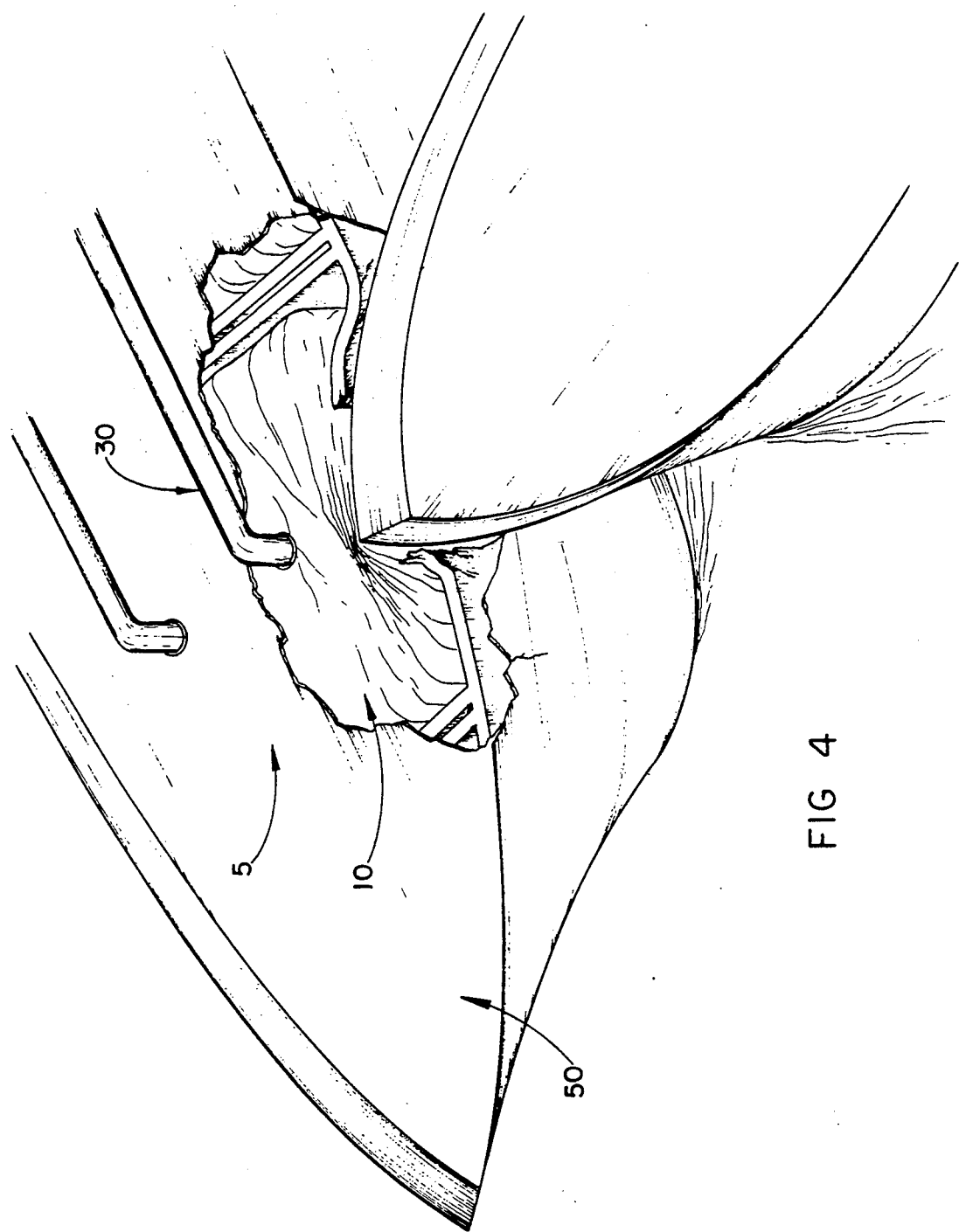
FIG. 4 is a perspective view of the leakage prevention system in use.

As best seen in FIG. 2, the puncture proof bladder 10 includes a flanged aperture 35 disposed along the inner surface of the filling and emptying opening 32 of the liquid storage and transportation tank 40. The flanged aperture 35 is adapted to be securely fitted around a junction pipe 30 connected at the tank opening 32. The junction pipe 30 functions as a means for containing and redistributing overflow, should the puncture proof bladder 10 be collapsed as a result of an impact, as shown in FIG. 4, by transferring the overflow to non-impacted tanks 41 and 42 as best seen in FIG. 1.

Now that the invention has been described,
What is claimed is:

1. For use in combination with liquid storage and transportation tanks, as those used in tankers and oil trucks, a leakage prevent system comprising:
   a puncture proof bladder disposed along the inner surface of the tank and sized to substantially the volume of the tank,
   said puncture proof bladder including an inner lining and an outer lining,
   said inner lining including a liquid impervious, flexible material,
   said outer lining including a substantially flexible material shell designed to be completely puncture resistant, thereby protecting said inner lining from punctures that could lead to leakage,
   said bladder further including fastening means to attach said puncture proof bladder to the upper surface of the tank, and
   a means for containing and redistributing overflow that may result from impact to said puncture proof bladder.

2. A leakage prevention system as in claim 1 wherein said puncture proof bladder includes a flanged aperture disposed along the inner surface of the filling and emptying opening of the tank.

3. A leakage prevention system as in claim 2 wherein said flanged aperture is adapted to be securely fitted around a junction pipe connected at the tank opening.

4. A leakage prevention system as in claim 1 wherein said flexible material shell is made of Kevlar or a similar flexible puncture proof material.

5. A leakage prevention system as in claim 4 wherein said flexible material shell includes an interwoven mesh of the puncture proof material.

6. A leakage prevention system as in claim 4 wherein said flexible material shell is approximately 2" thick.

7. A leakage prevention system as in claim 1 wherein said inner lining is made of a 1" to 1½ layer of rubber or a like material.

8. A leakage prevention system as in claim 1 wherein said fastening means includes an exterior flexible lining, substantially the same composition as said inner lining, adapted to be fitted around the exterior of said outer lining in an encasing, supporting manner.

9. A leakage prevention system as in claim 8 wherein said fastening means further includes a series of rivets passing through said exterior flexible lining and fastening in a secured and supporting manner along the upper surface of the tank.

10. A leakage prevention system as in claim 9 wherein said rivets are mounted in such a manner that their flanged end is along the interior surface of said exterior flexible lining.

11. A leakage prevention system as in claim 1 wherein said means for containing and redistributing overflow includes said junction pipe connected at said flanged aperture which transfers all overflow to other non-impacted tanks.

* * * * *